(12) United States Patent
Wu et al.

(10) Patent No.: US 7,761,430 B2
(45) Date of Patent: Jul. 20, 2010

(54) VERIFICATION OF CROSS DOMAIN DATA SYSTEM QUERY RESULTS

(75) Inventors: Guang-an Wu, Sammamish, WA (US); Karthik Kalyanaraman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 11/128,899

(22) Filed: May 12, 2005

(65) Prior Publication Data

US 2006/0259459 A1   Nov. 16, 2006

(51) Int. Cl.
G06F 7/00 (2006.01)

(52) U.S. Cl. .................... 707/690; 707/802; 707/809

(58) Field of Classification Search .................. 707/201
See application file for complete search history.

(56) References Cited

U.S. PATENT DOCUMENTS

| | | | | | |
|---|---|---|---|---|---|
| 5,392,390 | A | * | 2/1995 | Crozier | 715/751 |
| 5,566,332 | A | * | 10/1996 | Adair et al. | 707/101 |
| 5,859,972 | A | * | 1/1999 | Subramaniam et al. | 709/203 |
| 6,381,616 | B1 | * | 4/2002 | Larson et al. | 707/201 |
| 6,718,320 | B1 | * | 4/2004 | Subramanian et al. | 707/719 |
| 6,721,736 | B1 | * | 4/2004 | Krug et al. | 707/5 |
| 6,745,211 | B2 | * | 6/2004 | Kabasakalian et al. | 707/690 |
| 6,775,680 | B2 | * | 8/2004 | Ehrman et al. | 707/102 |
| 6,807,539 | B2 | * | 10/2004 | Miller et al. | 707/3 |
| 7,007,007 | B2 | * | 2/2006 | Slutz | 707/809 |
| 7,054,881 | B2 | * | 5/2006 | Arcand et al. | 707/102 |
| 7,055,067 | B2 | * | 5/2006 | DiJoseph | 714/38 |
| 7,093,238 | B2 | * | 8/2006 | Givoni et al. | 717/129 |
| 7,149,746 | B2 | * | 12/2006 | Fagin et al. | 707/102 |
| 2001/0049694 | A1 | * | 12/2001 | Daudenarde | 707/200 |
| 2002/0055932 | A1 | * | 5/2002 | Wheeler et al. | 707/104.1 |
| 2003/0120464 | A1 | * | 6/2003 | Taft et al. | 702/186 |
| 2004/0153822 | A1 | * | 8/2004 | Arcand et al. | 714/38 |

OTHER PUBLICATIONS

Don Slutz, Massive Stochastic Testing of SQL, Microsoft Research and In the Proceeding of the 24th VLDB Conference, 1998.*

* cited by examiner

*Primary Examiner*—Neveen Abel Jalil
*Assistant Examiner*—Christyann R Pulliam
(74) *Attorney, Agent, or Firm*—Woodcock Washburn LLP

(57) ABSTRACT

Cross domain data systems are verified by creating a program in the target domain language which can be used to determine for a result item whether the result item should be part of a query result. The program is then used in order to determine, for a set of target domain data corresponding to source domain data, a set of expected result items. These are compared with the result from the cross domain data system in order to provide verification of cross domain data systems. Multiple queries may be automatically generated and verified according to this technique.

13 Claims, 5 Drawing Sheets

VERIFICATION OF CROSS DOMAIN DATA SYSTEM QUERY RESULTS

FIELD OF THE INVENTION

The present invention relates to data storage. More specifically, the present invention relates to verification of data systems bridging data domains.

BACKGROUND OF THE INVENTION

Data stored in computer systems may be used for many different purposes. Thus, different storage formats and indexing/retrieval systems for data have been developed in response to these different purposes or needs that users may have for data. These different storage and operation systems are known as data domains. For example, a relational database is a type of data domain. The relational database stores data and provides access to the data, for example via a database query language.

While a data domain may be useful for many purposes, it may also be the case that data stored in a data domain may be useful in a different data domain. For example, as discussed above, a relational database is a type of data domain. Another data domain is the object-oriented domain, in which data exists as objects that have both data and behavioral characteristics. Object-oriented technology supports the building of applications out of objects that have both data and behavior. Thus, the object-oriented domain is another, different data domain. Yet it is often useful for an application in the object-oriented domain to use data from the relational domain of the database. This situation and the resulting problems have been termed the "object-relational impedance mismatch."

Similarly, extensible markup language (XML) is a language used to create documents which are processed by an XML processor. XML is used increasingly in facilitating data exchange and a multiplicity of other uses, over the World Wide Web and elsewhere. However, XML documents containing data and other facets of the XML data domain are not directly compatible with, e.g., the relational domain.

In order to address these data domain mismatches, a number of systems have been developed which bridge multiple data domains. These are called cross domain data systems. Object relational systems are cross domain data systems which bridge the object-oriented data domain and the relational database data domain. XML Database are cross domain data systems which bridge the XML data domain and the relational database data domain.

Cross domain data systems allow data in one data domain to be accessed from another data domain. In cross domain data systems, the domain which serves to actually store data is called the source domain. The domain in which data is retrieved and manipulated is called the target domain. Systems which bridge source and target domains typically offer a query language for retrieving data stored in the source domain in a manner compatible with the target domain.

While source domains may have a query language of their own for retrieving data, cross domain data systems in many cases expose a separate query language of their own. The provision of a cross domain data system query language occurs for a number of reasons. The cross domain data system query language hides the source data domain system. It hides any complexities involved in accessing data from the source system. And it, in many cases, is closer to and/or consistent with the semantics of the target domain as opposed to the source domain.

In creating a cross domain data system, one difficulty is in making sure the system functions correctly. Verifying the correctness of results of queries executed on the cross domain data system is important. One way to do this verification is by manual (human) checking. This requires extensive resource use and is prone to human error. Prior art automatic verification methods have drawbacks as well.

File baseline verification is one traditional automatic verification method for cross domain data systems. For file baseline verification, a baseline file is created containing the results which should be retrieved by a cross domain data system for a particular query. The baseline file is created or checked by a human checker. The cross domain data system then runs the query to obtain results. The baseline file is then used in order to verify results obtained by the cross domain data system. This verification method has obvious drawbacks: first, human checkers may introduce errors into the process. Also, in addition to the cost of a human checker, this verification does not scale well. Larger data sets will require larger amounts of time taken to produce baseline files.

Another verification method involves running a query on the cross domain data system and an equivalent query on the source data system. Though concise and scalable, this approach is limited due to potential structural mismatches of data between source and target domains. The comparison may not be straightforward, for reasons similar to the reasons that a cross domain data system is useful; because of the differences in data domains, it can be difficult to translate a query in the query language of the cross domain data system (which, as discussed, is often closer and consistent with the semantics of the target domain) into a query on the source domain. Thus, manual translation of the cross domain query language queries is required. This introduces a human checker, which introduces error and resource considerations.

Thus, there is a need for a technique to allow the verification of cross domain data system queries, which is scalable and automated.

SUMMARY OF THE INVENTION

In order to verify cross domain data system query results, a query to be verified is translated into a program in the target domain language which can be used to determine, for any single result item, whether the result item would be returned in the results if the query is run on a data set including that result item.

The source domain which the query is to be run on includes some set of result items. In order to verify cross domain data system query results, a complete target data domain set including (in target domain form) all possible result items which might be obtained from the source domain is used. In one embodiment, this complete target data domain set is obtained via a "return-all" query which is run on the cross domain data system to returns all possible result items from the source domain in target domain form. This "return-all" query is a trivial query which is easily verified. Alternately, the complete target data domain set can be obtained in any other way. In another embodiment, a complete target domain set is obtained by, for each item in the source data domain set, creating a corresponding result item.

The query to be verified is run on the cross domain data system. The result is a cross domain data system query result.

The program in the target data domain language is executed on every result items in the complete target data domain set. If the program in the target data domain language determines for a possible result item in the complete target data domain set that the possible result item should have been returned as a result for the query to be verified, the result item should be included in the cross domain data system query result. If it is not, then verification has failed. If the program in the target data domain language determines for a possible result item in the complete target data domain set that the possible result item should not have been returned as a result for the query to be verified, then the result item should not be included in the cross domain data system query result. If it is, then verification has failed.

In one embodiment, every possible result item in the complete target data domain set is examined by running the program in the target data domain language and consulting the cross domain data system query result. In another embodiment, only some of the result items are examined in this way.

According to one embodiment of the invention, a number of queries are tested as described above, and the performance of the cross domain data system across multiple queries is evaluated.

Other features and advantages of the invention may become apparent from the following detailed description of the invention and accompanying drawings.

BRIEF DESCRIPTION OF THE DRAWINGS

The system and methods for using continuous attributes in decision trees in accordance with the present invention are further described with reference to the accompanying drawings in which.

DETAILED DESCRIPTION OF ILLUSTRATIVE EMBODIMENTS

Exemplary Computing Environment

Figure 1:
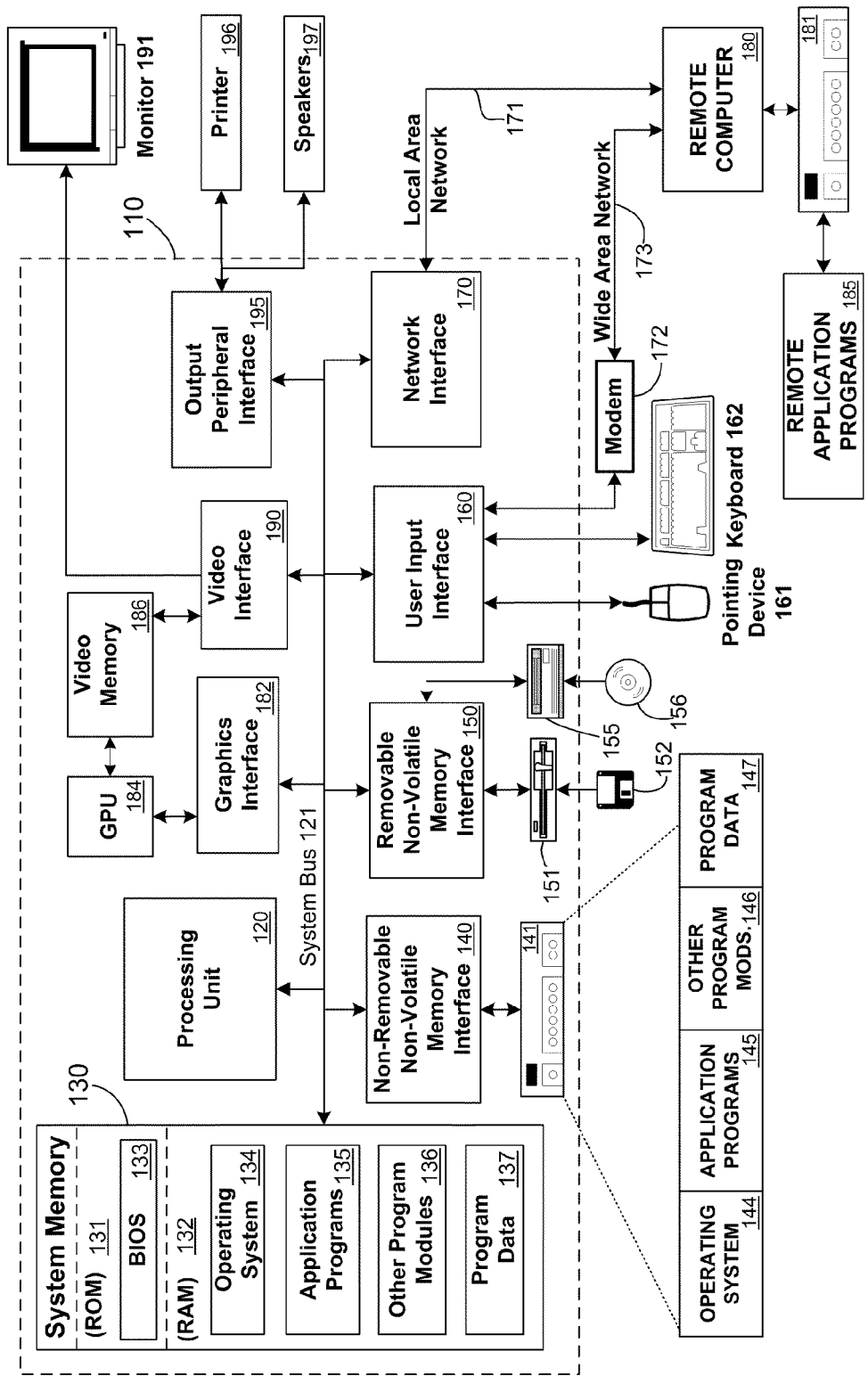
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Verification of Cross Domain Data System Query Results

In order to verify query results for a cross domain data system, a complete target data domain set is obtained. This complete target data domain set includes a version, in the target domain, of every data item in the source domain which could be returned as a result of a query. In one embodiment, this is obtained as the result of a trivial and easily verified query using the cross domain data system. In alternate embodiments, the complete target data domain set is available from an alternate source, or obtained using a different cross domain data system or a translator between the data domains.

Figure 2:
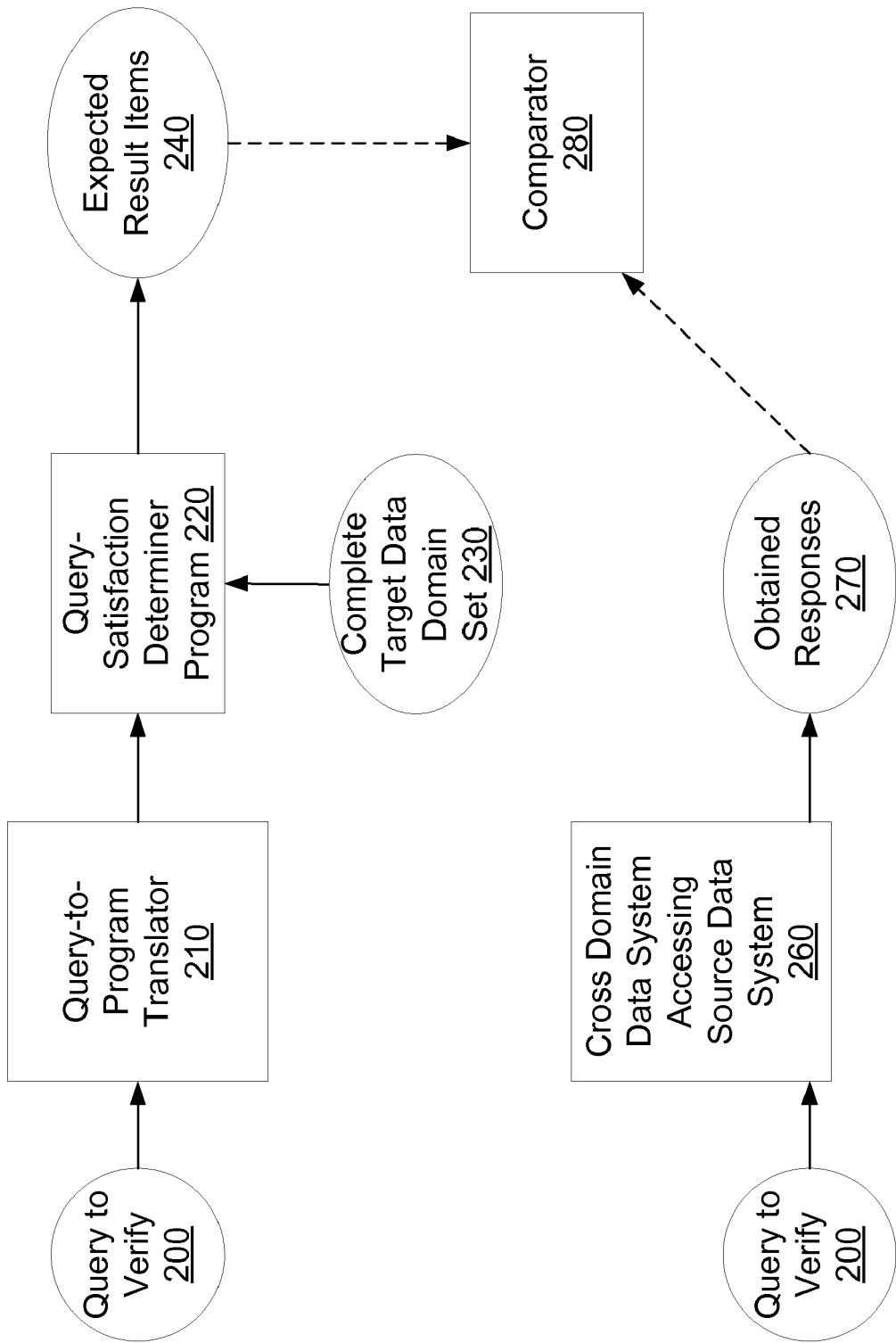
FIG. 2 is a block diagram of an first embodiment of the present invention.

FIG. 2 depicts a block diagram of query verification according to one embodiment of the present invention. As shown in FIG. 2, a query to verify 200 is provided to a query-to-program translator 210. This query-to-program translator 210 creates a program. This query-satisfaction determiner program 220 is used to determine, in the target data domain, for a given target data domain item, whether that target data domain item should be retrieved according to the query to verify 200. Thus, for example, where the target domain is an object domain, the query-to-program translator 210 produces a program which, given an object item, determines whether the query to be verified 200 should retrieve that object item. In alternate embodiments, the query-satisfaction determiner program is provided in some other way.

The complete target data domain set 230 is then used, along with the query-satisfaction determiner program 220, to find a set of expected result items 240. In one embodiment, the query-satisfaction determiner program 220 is used to determine, for each data item in the entire complete target data domain set 230, whether the data item should be included in the set of expected result items 240. The cross domain data system 260 being tested given the query to verify 200, producing obtained response 270. The expected result items 240 and the obtained response items 270 are then compared 280. If the set of obtained response 270 and the set of expected result items 240 are identical—in other words, if each result item in one set is present in the other set, and vice versa, then the cross domain data system 260 has performed correctly for query to verify 200.

In an alternate embodiment, a testing set selected from among the target data domain set 230 is used, along with the query-satisfaction determiner program 220. Only the data items in the testing set are considered by the query-satisfaction determiner program 220. In this embodiment, since a correctly functioning cross domain data system 260 may return result items in obtained response 270 which are not present in expected result items 240, the performance of the cross domain data system 260 is verified by ensuring that, for each data item in the set of expected result items 240, the data item appears in the set of obtained response items 270. In addition, however, it is verified that every item in the testing data set which is not in the set of expected result items 240 does not appear in the set of obtained response items 270. If these two conditions are satisfied, the performance of the cross domain data system 260 has been verified for the items in the testing data set. In an alternate embodiment, instead of creating a complete target data domain set 230, only a testing set is created rather than a complete target data domain set 230.

As described above, the query-satisfaction determiner program 220 is, in some embodiments, created by a query-to-program translator 210. This query-to-program translator in some embodiments is an automated generator of query-satisfaction determiner programs. In one embodiment, such an automated query-to-program translator 210 may function by parsing the query to verify 200 and constructing a parse tree for the query. This may be done, for example, using standard compiler tools such as Lex and Yacc. The parse tree is then walked in order to construct an equivalent program compatible with the target data domain that can evaluate the predicate embodied in the parse tree for any item in the target data domain. Thus, as an example, the target data domain may be an object domain, and the program created in the language C#. Since the query language for the cross domain data system is often similar to the query language for the target domain, the translation will generally be unambiguous and deterministic.

Table 1 includes some examples of queries to be verified 200 in an example cross domain data system query language and query-satisfaction determiner programs 220 in C# which evaluate whether a given object should be returned according to the query.

TABLE 1

Three Queries With Corresponding Query-Satisfaction Determiner Programs

```
// Get all Customers with Id > 1
List<Customer> Customers =
QueryProcessor.GetObjects<Customer>(Id > 1);
// Equivalent Predicate Evaluation
Public class Evaluator
{
  Public bool Evaluate(Customer Cust)
  {
```

TABLE 1-continued

Three Queries With Corresponding Query-Satisfaction Determiner Programs

```
    Return Cust.Id > 1;
  }
}
// Get all Customers with name John Smith
List<Customer> Customers =
QueryProcessor.GetObjects<Customer>(Name=="John Smith");
// Equivalent Predicate Evaluation
Public class Evaluator
{
  Public bool Evaluate(Customer Cust)
  {
    Return Cust.Name == "JohnSmith";
  }
}
// Get all Customers with at least one order of Product with Id 5
List<Customer> Customers =
QueryProcessor.GetObjects<Customer>
(Exists(MyOrders[ProductId ==5]);
// Equivalent Predicate Evaluation
Public class Evaluator
{
  Public bool Evaluate (Customer Cust)
  {
    Foreach (Order O in Cust.MyOrders)
    {
      If (O.ProductId == 5)
      {
        Return true;
      }
    }
    Return false;
  }
}
```

While these examples describe a target data domain that is object oriented, and C# and a hypothetical query syntax, the invention can be applied to any cross domain data systems. As an example, if the target data domain is an XML (eXtensible Markup Language) domain, the query language may be XPath (a XML query language). In such cases, the query-satisfaction determiner program 220 can be a style sheet which can be applied to the complete target domain data set 230 (at one time) or to a testing data set in order to, in one action, produce the expected result items 240. While the query-satisfaction determiner program is described as a program, any mode in which the determination made can be accomplished in the target data domain is contemplated including but not limited to the described program and style sheet modes.

Figure 3:
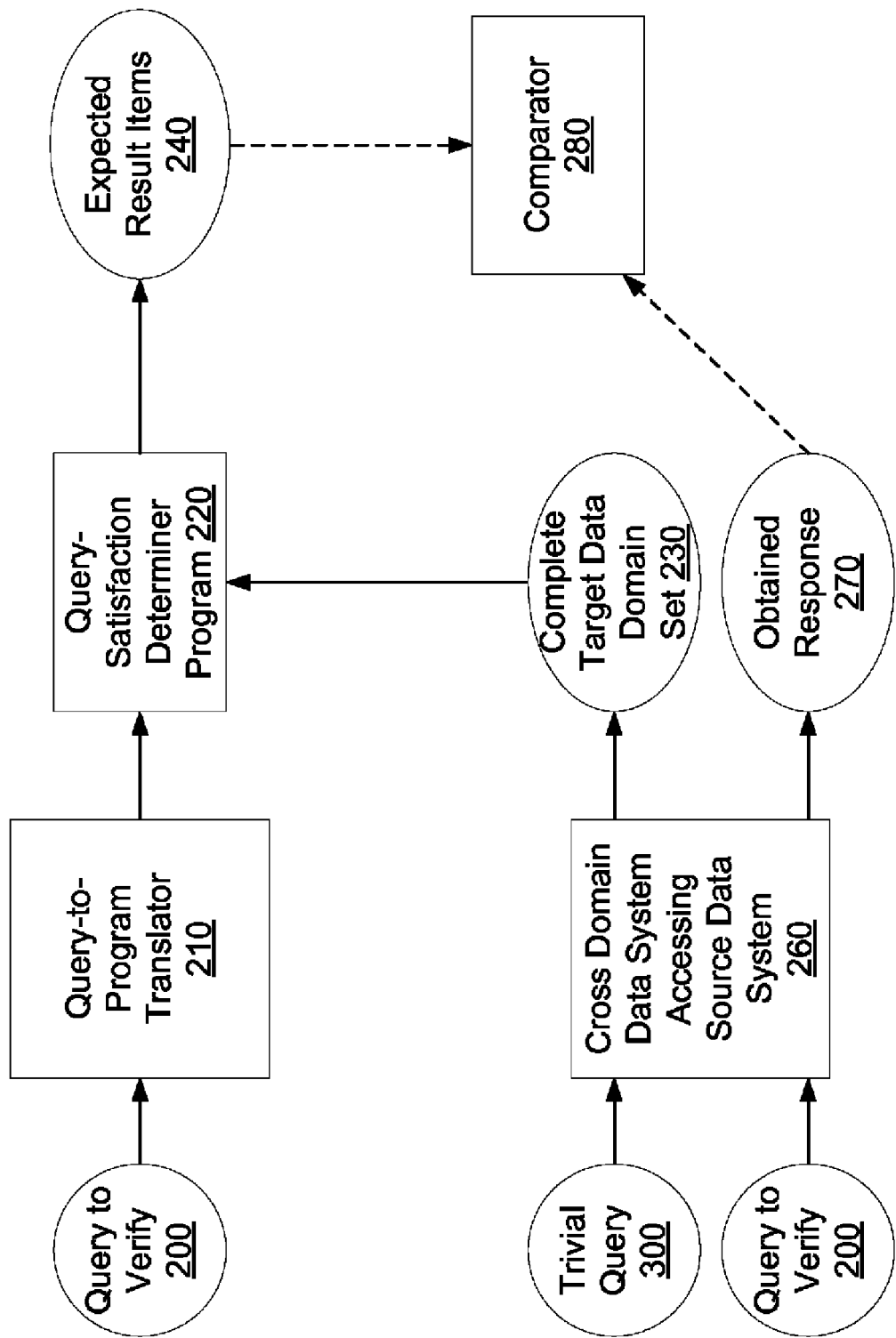
FIG. 3 is a block diagram of an alternate embodiment of the present invention.

As described above, the compete target data domain 230 is obtained via a trivial query on the cross domain data system 260. FIG. 3 depicts a block diagram of query verification according to one embodiment of the present invention. In this embodiment, as can be seen, a trivial query 300 is used along with the cross domain data system 260 in order to create the complete target data domain set 230.

In one embodiment, more than one query to verify 200 is produced in order to verify the performance of the cross domain data system 260 on multiple queries. Automated query generation can be used in order to create query test cases.

Figure 4:
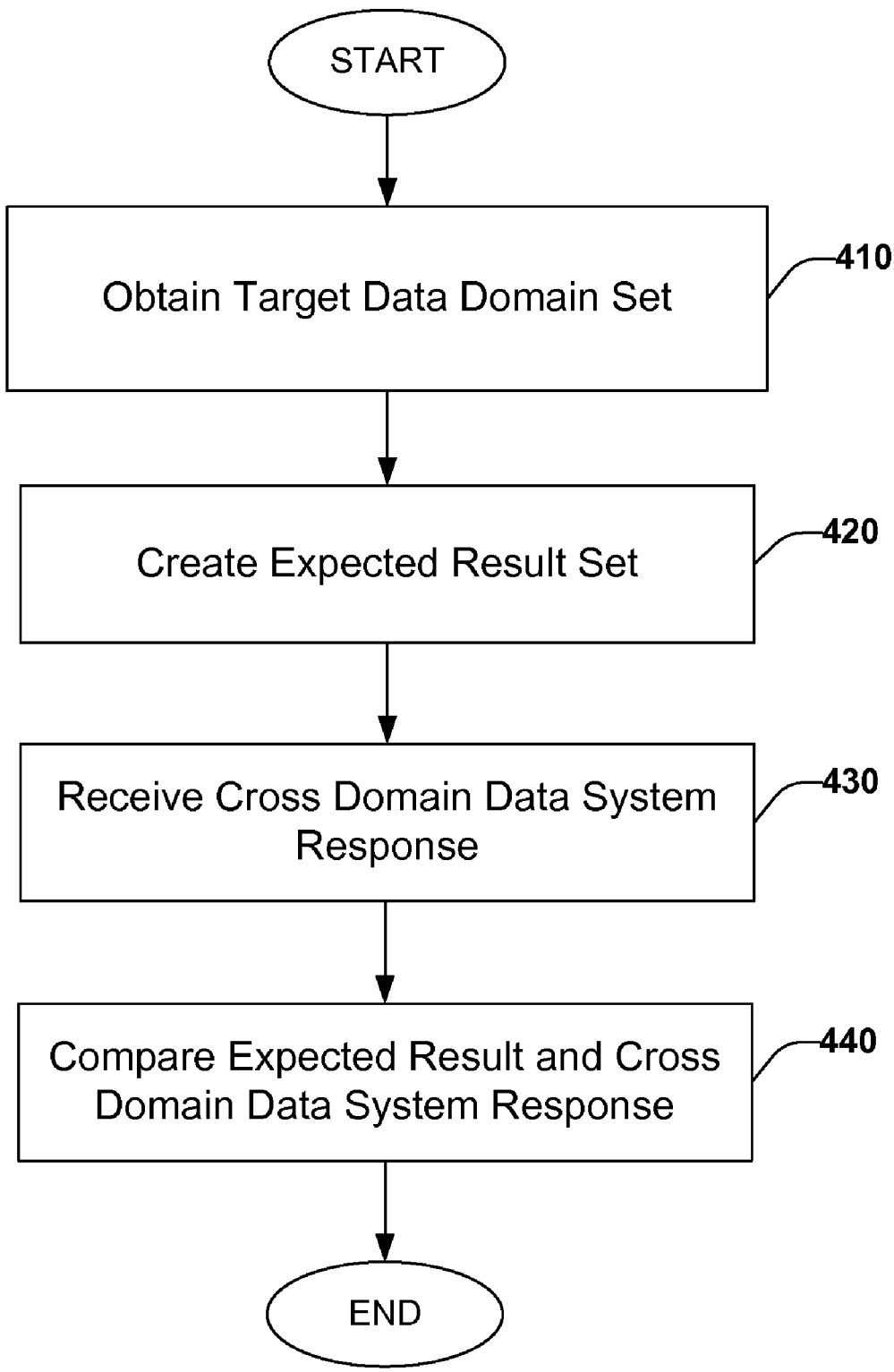
FIG. 4 is a flow diagram of a method for verifying a cross domain data system with respect to a specific query according to the present invention.

FIG. 4 is a flow diagram of a method for verifying a cross domain data system with respect to a specific query according to the present invention. The target domain data set 230 is obtained in step 410. As described above, this may be the entire complete target domain data set or a testing data set. The expected result set is created at step 420. A response is obtained from the cross domain data system for the query at step 430. The expected result and cross domain data system response are compared. Based on this comparison, the cross domain data system 260 either passes (is verified) or fails for this query.

Figure 5:
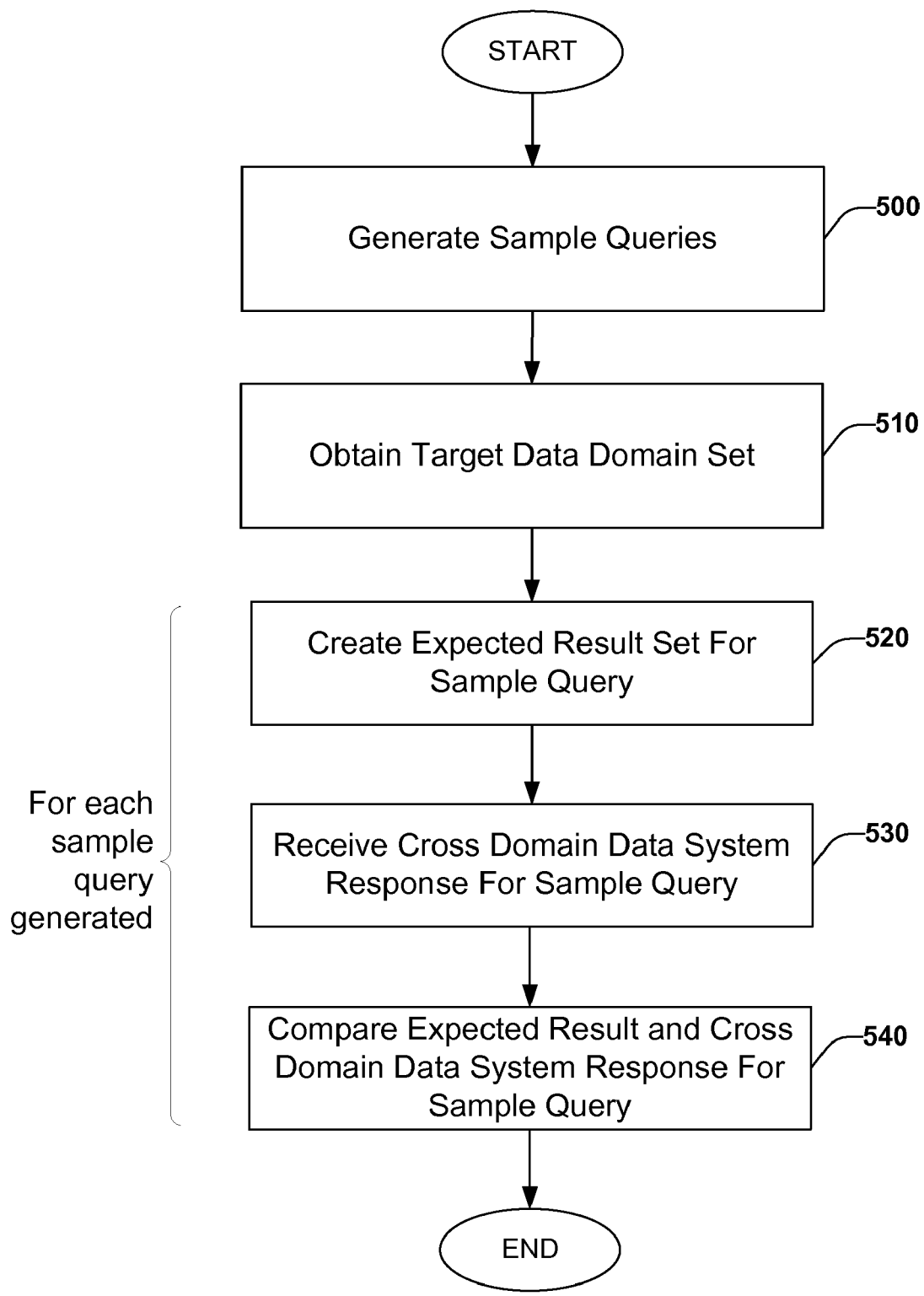
FIG. 5 is a flow diagram of a method for verifying a cross domain data system with respect to a number of queries according to the present invention.

FIG. 5 is a flow diagram of a method for verifying a cross domain data system with respect to a number of queries according to the present invention. Sample queries for verification are generated at step 500. The target domain data set 230 is obtained in step 510. Again, as described above, this may be the entire complete target domain data set or a testing data set. For each of the sample queries, (a) the expected result set is created at step 520, (b) a response is obtained from the cross domain data system for the query at step 530, and (c) the expected result and cross domain data system response are compared. Based on this comparison, the cross domain data system either passes (is verified) or fails for this query. According to one embodiment, the cross domain data system 260 is verified if it is verified for all sample queries. According to other embodiments, information regarding the verification status for queries, including details regarding the results which caused verification failures, are provided in order for debugging to occur.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for verifying a cross domain data system in a target data domain where data is obtained by the cross domain data system from a source data domain and is employed in the target data domain, the data being expressed in a different format in the source data domain as compared to in the target data domain, wherein for a given source domain data set comprising at least one source data domain item from the source data domain, said cross domain data system at the target data domain responds to a given query in a cross domain data system query language with a response set of domain items from the source data domain, where each domain item in said response set is expressed in the format of the target data domain and corresponds to a source data domain item from the source data domain responsive to said given query, said method comprising:
   obtaining a complete target data domain set from the source data domain, said complete target data domain set comprising, for each source data domain set item in said source data domain set, a corresponding target data domain item expressed in the format of the target data domain;
   creating an expected result set in the target data domain comprising data items from among said complete target data domain set, where each data item in said expected result set satisfies a specified query and is expressed in the format of the target data domain, the specified query creating the expected result set being expressed in a query language specific to the target data domain;
   receiving from said cross domain data system in response to said specified query a cross domain data system response set from the source data domain, where each data item in said cross domain system response set is expressed in the format of the target data domain, the specified query creating the cross domain system response set being expressed in a query language specific to the cross domain data system and different from the query language specific to the target data domain; and
   comparing said expected result set and said cross domain data system response set to determine whether said cross domain data system is verified for said specific query,
   where creating the expected result set comprises:
   creating a query-satisfaction determiner program in said target data domain where said query-satisfaction determiner program determines, for each target data domain item in the complete target data domain set, whether said target data domain item satisfies said specific query; and
   creating the expected result set by using said query-satisfaction determiner program to determine which target data domain items from among a testing set of target data domain items from said complete target data domain set satisfy said specific query and adding target data domain items from among said testing set which satisfy said specific query to said expected result set,
   where said creating a query-satisfaction determiner program comprises using an automatic query-satisfaction determiner program that generates the program from said specified query,
   where the source data domain is an XML (eXtensible Markup Language) data domain and the target data domain is a relational database data domain.

2. The method of claim 1, where said creating the expected result set comprising data items from among said complete target data domain set comprises:
   creating the testing set of target data domain items from among said complete target data domain set; and
   storing as said expected result set any target data domain items from among said testing set which satisfy said specific query.

3. The method of claim 2, where said testing set comprises all target data domain items from said complete target data domain set, and where said comparing said expected result set and said cross domain data system response set to determine whether said cross domain data system is verified for said specific query comprises:
   determining when said expected result set and said cross domain data system response set are equivalent; and
   when said expected result set and said cross domain data system response set are equivalent, determining that said cross domain data system is verified for said specific query.

4. The method of claim 2, where said testing set comprises a subset of said complete target data domain set, and where said comparing said expected result set and said cross domain data system response set to determine whether said cross domain data system is verified for said specific query comprises:
   determining when each target data item contained in both said testing set and in said expected result set is contained in said cross domain data system response set;

determining when each target data item contained in said testing set but not in said expected result set is not contained in said cross domain data system response set; and when each target data item contained in both said testing set and in said expected result set is contained in said cross domain data system response set and when each target data item contained in said testing set but not in said expected result set is not contained in said cross domain data system response set then determining that said cross domain data system is verified for said specific query.

5. The method of claim 1, where said target data items are of a target data type and where automatic query-satisfaction determiner program generating method comprises:

parsing said specific query;

constructing a parse tree for said specific query; and constructing a program by walking said parse tree and generating a program which evaluates a predicate embodied in said parse tree on items of said target data type.

6. A method for verifying a cross domain data system in a target data domain where data is obtained by the cross domain data system from a source data domain and is employed in the target data domain, the data being expressed in a different format in the source data domain as compared to in the target data domain, wherein for a given source domain data set comprising at least one source data domain item from the source data domain, said cross domain data system at the target data domain responds to a given query in a cross domain data system query language with a response set of domain items from the source data domain, where each domain item in said response set is expressed in the format of the target data domain and corresponds to a source data domain item from the source data domain responsive to said given query, said method comprising:

generating a plurality of sample queries in said cross domain data system query language;

obtaining a complete target data domain set from the source data domain, said complete target data domain set comprising, for each source data domain set item in said source data domain set, a corresponding target data domain item expressed in the format of the target data domain;

for each of said sample queries, creating an expected result set in the target data domain comprising data items from among said complete target data domain set, where each data item in said expected result set satisfies said query and is expressed in the format of the target data domain, each sample query creating the corresponding expected result set being expressed in a query language specific to the target data domain;

for each of said sample queries, receiving from said cross domain data system in response to said query a cross domain data system response set from the source data domain, where each data item in said cross domain system response set is expressed in the format of the target data domain, each sample query creating the corresponding cross domain system response set being expressed in a query language specific to the cross domain data system and different from the query language specific to the target data domain;

for each of said sample queries, comparing said expected result set and said cross domain data system response set to determine whether said cross domain data system is verified for said query; and when said cross domain data system is verified for each query, determining that said cross domain data system is verified, where said step of creating the expected result set comprising target data items from among said complete target data domain set, where each data item in said expected result set satisfies said query comprises:

creating a query-satisfaction determiner program in said target data domain where said query-satisfaction determiner program determines, for each target data domain item in the complete target data domain set, whether said target data domain item satisfies said query; and creating the expected result set by using said query-satisfaction determiner program to determine which target data domain items from among a testing set of target data domain items from said complete target data domain set satisfy said query and adding target data domain items from among said testing set which satisfy said query to said expected result set, where said creating a query-satisfaction determiner program comprises using an automatic query-satisfaction determiner program generating method, where the source data domain is an XML (eXtensible Markup Language) data domain and the target data domain is a relational database data domain.

7. The method of claim 6, where said generating a plurality of sample queries in said cross domain data system query language comprises:

using an automated query generation system for generating queries in said cross domain data system query language.

8. The method of claim 6, where said target data items are of a target data type and where automatic query-satisfaction determiner program generating method comprises:

parsing said specific query;

constructing a parse tree for said specific query; and constructing a program by walking said parse tree and generating a program which evaluates a predicate embodied in said parse tree on items of said target data type.

9. A system for verifying a cross domain data system in a target data domain where data is obtained by the cross domain data system from a source data domain and is employed in the target data domain, the data being expressed in a different format in the source data domain as compared to in the target data domain, wherein for a given source domain data set comprising at least one source data domain item from the source data domain, said cross domain data system at the target data domain responds to a given query in a cross domain data system query language with a response set of domain items from the source data domain, where each domain item in said response set is expressed in the format of the target data domain and corresponds to a source data domain item from the source data domain responsive to said given query, said system comprising:

target data domain set storage for storing a complete target data domain set as obtained from the source data domain, said complete target data domain set comprising, for each source data domain set item in said source data domain set, a corresponding target data domain item expressed in the format of the target data domain;

expected result set storage for storing an expected result set in the target data domain comprising data items from among said complete target data domain set, where each data item in said expected result set satisfies a specified query and is expressed in the format of the target data domain, the specified query of the expected result set being expressed in a query language specific to the target data domain;

cross domain data system response storage for storing a cross domain data system response set from the source data domain received in response to said specified query to said cross domain data system, where each data item in said cross domain system response set is expressed in a form compatible with the format of the target data domain, the specified query of the cross domain system response set being expressed in a query language specific to the cross domain data system and different from the query language specific to the target data domain; and comparator for comparing said expected result set and said cross domain data system response set to determine whether said cross domain data system is verified for said specific query, the system further comprising a query-satisfaction determiner program in said target data domain where said query-satisfaction determiner program determines, for each target data domain item in the complete target data domain set, whether said target data domain item satisfies said specific query, the system further comprising a query-to-program translator creating said query-satisfaction determiner program automatically from said specific query, where the source data domain is an XML (eXtensible Markup Language) data domain and the target data domain is a relational database data domain.

10. The system of claim 9, further comprising:

testing set creator creating a testing set of target data domain items from among said complete target data domain set; and where said expected result set storage stores as said expected result set any target data domain items from among said testing set which satisfy said specific query.

11. The system of claim 10, where said testing set comprises all target data domain items from said complete target data domain set, and where said comparator determines when said expected result set and said cross domain data system response set are equivalent; said system further comprising:

verifier status storage for, when said expected result set and said cross domain data system response set are equivalent, storing data indicating that said cross domain data system is verified for said specific query, and otherwise, storing data indicating that said cross domain data system is not verified for said specific query.

12. The system of claim 10, where said testing set comprises a subset of said complete target data domain set, and where said comparator determines when each target data item contained in both said testing set and in said expected result set is contained in said cross domain data system response set, and when each target data item contained in said testing set but not in said expected result set is not contained in said cross domain data system response set, said system further comprising:

verifier status storage for, when each target data item contained in both said testing set and in said expected result set is contained in said cross domain data system response set and when each target data item contained in said testing set but not in said expected result set is not contained in said cross domain data system response set, storing data indicating that said cross domain data system is verified for said specific query, and otherwise, storing data indicating that said cross domain data system is not verified for said specific query.

13. The system of claim 9, where said target data items are of a target data type and where said query-to-program translator comprises:

a parser for parsing said specific query;

a parse tree constructor for constructing a parse tree for said specific query; and a query-satisfaction determiner program constructor for constructing a program by walking said parse tree and generating a program which evaluates a predicate embodied in said parse tree on items of said target data type.

* * * * *

UNITED STATES PATENT AND TRADEMARK OFFICE
CERTIFICATE OF CORRECTION

| | | |
|---|---|---|
| PATENT NO. | : 7,761,430 B2 | Page 1 of 1 |
| APPLICATION NO. | : 11/128899 | |
| DATED | : July 20, 2010 | |
| INVENTOR(S) | : Guang-an Wu et al. | |

It is certified that error appears in the above-identified patent and that said Letters Patent is hereby corrected as shown below:

In column 13, lines 8-9, in Claim 9, after "in" delete "a form compatible with".

Signed and Sealed this
Eighth Day of February, 2011

David J. Kappos
*Director of the United States Patent and Trademark Office*